(12) United States Patent
Inoue

(10) Patent No.: US 6,805,356 B2
(45) Date of Patent: Oct. 19, 2004

(54) BRUSH SEAL AND BRUSH SEAL DEVICE

(75) Inventor: Hideyuki Inoue, Sakado (JP)

(73) Assignee: Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 10/255,672

(22) Filed: Sep. 27, 2002

(65) Prior Publication Data

US 2003/0062685 A1 Apr. 3, 2003

(30) Foreign Application Priority Data

Sep. 28, 2001 (JP) ........................................ 2001-301210

(51) Int. Cl.[7] .............................................. F16J 15/44
(52) U.S. Cl. ........................ 277/355; 277/416; 277/547
(58) Field of Search ................................ 277/355, 543, 277/547, 548, 416

(56) References Cited

U.S. PATENT DOCUMENTS

| | | | | |
|---|---|---|---|---|
| 2,124,108 A | * | 7/1938 | Grece | 277/356 |
| 2,233,579 A | * | 3/1941 | Bowers | 92/221 |
| 4,358,120 A | * | 11/1982 | Moore | 277/355 |
| 4,645,217 A | * | 2/1987 | Honeycutt et al. | 277/555 |
| 5,031,922 A | * | 7/1991 | Heydrich | 277/355 |
| 5,042,823 A | * | 8/1991 | Mackay et al. | 277/355 |
| 5,071,138 A | * | 12/1991 | Mackay et al. | 277/303 |
| 5,108,116 A | * | 4/1992 | Johnson et al. | 277/355 |
| 5,316,318 A | * | 5/1994 | Veau | 277/355 |
| 5,755,445 A | * | 5/1998 | Arora | 277/418 |
| 6,196,550 B1 | * | 3/2001 | Arora et al. | 277/355 |
| 6,267,381 B1 | * | 7/2001 | Wright | 277/355 |
| 2002/0117806 A1 | * | 8/2002 | Grondahi | 277/355 |

FOREIGN PATENT DOCUMENTS

EP  0473018 A2 * 8/1990

* cited by examiner

Primary Examiner—Alison K. Pickard
(74) Attorney, Agent, or Firm—Arent Fox PLLC

(57) ABSTRACT

One brush seal unit is piled on another one in such a manner that thin beams of the one brush seal unit overlap the slits of the another brush seal unit easily using their positioning sections in order to improve sealing ability. The pitches at the positioning sections of each brush seal unit is determined so that the slits and thin beams of the neighboring and piled brush seal units are overlapped each other by relatively displacing the neighboring brush seal units.

5 Claims, 15 Drawing Sheets

BRUSH SEAL AND BRUSH SEAL DEVICE

BACKGROUND OF THE INVENTION

1. Field of the Invention

The present invention relates to a strip-like brush seal having a plurality of thin plates that are processed to have thin, cantilever beams at their one end and relates to a brush seal device, for sealing between a rotational shaft and a mating component movable relatively thereto, for example in an aircraft and a gas turbine. More particularly, the present invention relates to a technical field of a brush seal and a brush seal device capable of following the rotation or minute variation of one component with respect to other component to deform during relative movement for effectively sealing between both components.

2. Description of the Related Art

There exists, as shown in FIG. 12, a brush seal device 100 as one related art of the present invention. FIG. 12 is a sectional view of a brush seal device 100 mounted between a rotational shaft 120 and a casing 110 through which the rotational shaft 120 passes. The casing 110 is a component of a steam turbine or gas turbine. The brush seal device 100 separates the casing 110 and the rotational shaft 120 so as to seal fluidly.

In FIG. 12, the brush seal device 100 is formed in a ring shape and attached to a channel section 112 of the casing 110. Main components of the brush seal device 100 are a brush seal 109, a back plate 102 and a retaining plate 103. In the brush seal 109, a number of bristles 101 in the form of a wall are arranged circumferentially, and one end of the bristles are coupled together to form an attachment section 104. The free end face 105 as the other end of the brush seal 109 faces the rotational shaft 120. The diameter of each bristle 101 used in general is 0.02 to 0.5 mm. However its sealing ability will be reduced because the brush seal device is formed of linear bristles 101 in the form of a wall that has been merely brought together. In order to overcome such a drawback the thickness of the wall formed with the bristles 101 must be increased and thus tens of thousands or hundreds of thousands of bristles 101 are necessarily used.

An annular back plate 102 is located on one side face of the brush seal 109 with its side face 108 contacting the one side face of the brush seal 109 and bears each of the bristles 101 against the action of the sealed fluid pressure.

A retaining plate 103 formed as a ring plate is disposed integrally on the other side face of the brush seal 109 to sandwich, in cooperation with the back plate 102, the brush seal 109 on its attachment section 104 side. The retaining ring 103 has a small thickness in its radial direction so that the brush seal 109 is exposed to allow the brush seal 109 to deform corresponding to the contact of the rotational shaft 120 therewith.

The back plate 102, the attachment section 104 of the brush seal 109 and the retaining plate 103 are welded at one end together to form into a connecting section 106.

In FIG. 12, the rotational shaft 120 shown by an actual line is in a state that the rotational shaft 120 is normally fitted without oscillation and every bristle 101 extends straight and inclines in the rotating direction, relative to the radial direction of the rotational shaft 120. Accordingly, the free end face 105 will be precisely finished after fabrication of the brush seal 109 so as to fit the rotational shaft 120 normally. It is however difficult to process the free end face 105 because tens or hundreds of thousands of bristles 101 arrayed in the form of a wall in the free end face 105 are apt to deform.

When the rotational shaft 120 then contacts the brush seal 109, the brush seal 109 is pressed against the rotational shaft 120 while its tilt angle is increased. At the same time there are created gaps between neighboring bristles 101 due to their movement and/or deformation.

In this state, as shown in FIG. 12, if the pressure of the sealed fluid is a high pressure P1, the differential pressure (P1–P2) between P1 and a low pressure P2 is increased, and then the gaps formed between neighboring bristles 101 will be further enlarged, resulting in the sealing ability to be worsened.

FIGS. 13 and 14 are partial front views of the brush seal 109, seen radially from its inner side.

In FIGS. 13 and 14, if the sealed fluid enters the gaps between straight bristles 101, each bristle 101 arranged as shown in FIG. 13, seen from their inner circumferential side, is pushed aside such that each gap width between the bristles 101 is increased as shown in FIG. 14, and as a result the sealed fluid leaks from those gaps.

If neighboring bristles 101 inclined are separated apart each other by the pressure described above, one of the bristles 101 separated apart tends to displace to reduce its tilt angle, and it is therefore deformed such that its length along the radial direction is long. Accordingly, the pressure applied to the rotational shaft 120 is increased to cause wear. This wearing action will be accelerated as the thickness of the bundle of the bristles 101 becomes large for improving the sealing ability.

In this state, with the increase of the gap C formed between the free end face 105 of the bristles 101 and the rotational shaft 120 (Refer to the rotational shaft shown by a phantom line in FIG. 12) on the diametrically opposite side, the sealed fluid leaks from the gap C.

Further, there exists a seal device as another related art, as shown in FIG. 15. In the figure, thin plate like leaves are piled as a seal 209 along the circumferential direction of the rotational shaft 120 to seal between a high pressure side area P1 and a low pressure side area P2.

Outer circumferential portion of the seal 209 of plate like leaves is brazed to form an attachment section 104. Then the seal 209 is attached to the channel section of the casing 110 through the brazed attachment section 104.

Also, a back plate 102 is disposed on the side face of the seal 209 at the low pressure side area P2, a retaining plate 103 is disposed on the side face at the high pressure side area P1, and both the plates 102 and 103 retain both sides of the seal 209, respectively.

However, when the rotational shaft 120 eccentrically presses against the seal 209 formed in the above manner, the seal 209 having piled thin plate like leaves to form an annular body has no space for accommodating own elastic deformation and thus the spring constant corresponding to the resilient deformation is increased. It is therefore difficult for the seal 209 to follow the eccentric behavior of the rotational shaft 120.

Further, in the seal 209 in which thin plate like leaves are piled in the direction of the action of the sealed fluid pressure, gaps are forced to create between two neighboring plates. This causes a problem relating to its sealing ability for fluid leakage.

Moreover, the seal 209 forming an annular body includes hundreds of thousands of thin plate like leaves that are piled in the annular direction. Therefore, it is extremely difficult to fabricate the seal 209. Further, as the length along the outer circumference of the annular body of the seal 209 is longer than that along the inner circumference, spacers for compensating the difference in length theretween are necessarily disposed between thin plate like leaves at their outer circumferential sides. However, gaps still remain between the surfaces of the piled plate like leaves. In this viewpoint, there also exists the problem of sealing ability. Also, in this constitution whose flexibility may be reduced, the free end face 105 of the seal 209 be worn quickly due to its worsened elastic response.

In the brush seal device 100 constituted as described above, when the sealed fluid acts on the bristles 101, gaps are created therebetween, as shown in FIG. 14, because the bristles 101 are randomly gathered together to form a bundle in the shape of a wall.

Further, when the rotational shaft 120 contacts the brush seal 109 as a result of oscillation or vibration, the brush seal 109 is pressed against the rotational shaft 120, and at the same time its tilt angle is increased, as shown in FIG. 12. If the number of the bristles 101 is increased in order to improve the sealing ability, the elastically responsive deformation of each bristle 101 will be worsened during contacting the rotational shaft 120, causing to promote the wear on the contacting surfaces. The sealing ability will be further reduced.

Also, in the seal 209 having thin plate like leaves piled to contact each other in the direction of the action of the sealed fluid, gaps are apt to be created between thin plate like leaves, causing leakage of the sealed fluid. Additionally, as the flexibility of the free end 105 of the seal 209 is limited, it will be worn quickly.

The present invention has been made in consideration of the problems as mentioned above, and an technical problem of the invention is to allow to easily pile brush seal units one by one to complete a brush seal so that the slits defining thin beams of a brush seal unit are blocked by the thin beams of a neighboring brush seal unit placed in position.

Another technical problem is to provide easy designing, processing and fabrication. Still another technical problem is to reduce the manufacturing and assembly costs of the brush seal.

Further it is still another technical problem to improve the sealing ability even if the piling thickness of the brush seal is thin, and to improve elastic deformation of the brush seal with respect to the depression force applied by the rotational shaft and to reduce wear on the brush seal by the rotational shaft.

In addition, it is yet another technical problem to provide the brush seal with good ability of the brush seal to follow in response to the relative displacement between the brush seal and the outer circumference of the rotational shaft for improving the sealing ability.

SUMMARY OF THE INVENTION

The present invention has been made to solve the problems as mentioned above, and technical means for solving the problems are constituted as below.

A brush seal of first preferred embodiment according to the present invention is a brush seal having piled brush seal units and mounted on one of two components that are relatively rotated, for sealing the clearance given between the two components, comprising: a plurality of the brush seal units, each having a strip-like brush section on the side facing the other component and having a base plate section on the side opposing the brush section side, the brush section being formed with thin beams each of which is between two slits, and the base plate section being fixed to the one component; and a plurality of positioning sections located in the base plate section of each brush seal unit; wherein each pitch dimension of each positioning section is determined so that the positioning sections, the slits and the thin beams are formed in such a physical relationship that, when the brush seal units are piled, strip-like slits and thin beams overlap each other by relatively displacing by one pitch the neighboring brush seal units.

In the brush seal of the first embodiment of the present invention, neighboring brush seal units are piled such that their positioning sections are relatively displaced by one pitch. Therefore, the slits of one brush seal unit overlap the thin beams of the neighboring brush seal unit, while the beams of the one brush seal unit overlap the slits of the neighboring one, thereby to seal the slits.

Then another brush seal unit is piled with one pitch displacement in the positioning sections relative to one of the two brush seal units that have been already piled. The slits and thin beams of those brush seal units overlap in the same manner as described.

It is extremely difficult for an assembly machine to pile the brush seal units with the thin beams and slits overlapping precisely each other. However, a piling condition effective to sealing ability is easily achieved with such positioning sections.

Accordingly, it becomes possible to improve the sealing ability of the brush seal even if the number of the brush seal units to be piled is less. Additionally, it is expected that frictional wearing is effectively prohibited as the brush seal has flexibility due to less number of the piled brush seal units and can deform elastically corresponding to the contact of the rotational shaft. Further, it is easy to assemble the brush seal units and also considerably improve the accuracy in the assembly.

A brush seal device of second preferred embodiment according to the present invention is a brush seal device mounted on one of two components that are relatively rotated, for sealing the clearance given between the two components, comprising: a brush seal having piled brush seal units, each having a strip-like brush section on the side facing the other component and having a base plate section on the side opposing the brush section side, the brush section being formed with thin beams each of which is between two slits, and the base plate section being fixed to the one component; a back plate section having a fixing section provided with a positioning pin capable of fitting in the base plate section of the brush seal and having a bearing face for bearing the side face of the brush seal; and a retaining section for retaining, in cooperation with the back plate section, the base plate section of the brush seal; wherein the base plate section of each brush seal unit is provided with positioning sections in which holes are formed by one pitch thereof; each pitch is defined as an interval so that, when the positioning sections of the neighboring brush seal units piled are relatively displaced, the slits and thin beams of the neighboring brush seals overlap each other; and the positioning pin of the back plate section fits in a hole of the positioning sections of the brush seal, thereby to couple the back plate section with the brush seal.

In the brush seal device of the embodiment according to the present invention, neighboring brush seal units are piled such that their positioning sections are relatively displaced by one pitch. Therefore, the slits of one brush seal unit overlap the thin beams of the neighboring brush seal unit, while the beams of the one brush seal unit overlap the slits of the neighboring one.

It is extremely difficult for an assembly machine to pile the brush seal units with the thin fine beams and slits overlapping precisely each other, as specified in design. However, a piling condition effective to sealing ability is easily achieved by displacing one positioning section to the other.

Additionally, it becomes possible to assemble the brush seal exactly and easily without deviation among the brush seal units, by fitting a positioning section to the positioning pin of the back plate section and sandwiching against the retaining section.

DETAILED DESCRIPTION OF THE INVENTION

Some preferred embodiments of the brush seal devices of the present invention will be described hereinafter with reference to the accompanying drawings in detail. Those drawings herein are exact design drawings.

Figure 1:
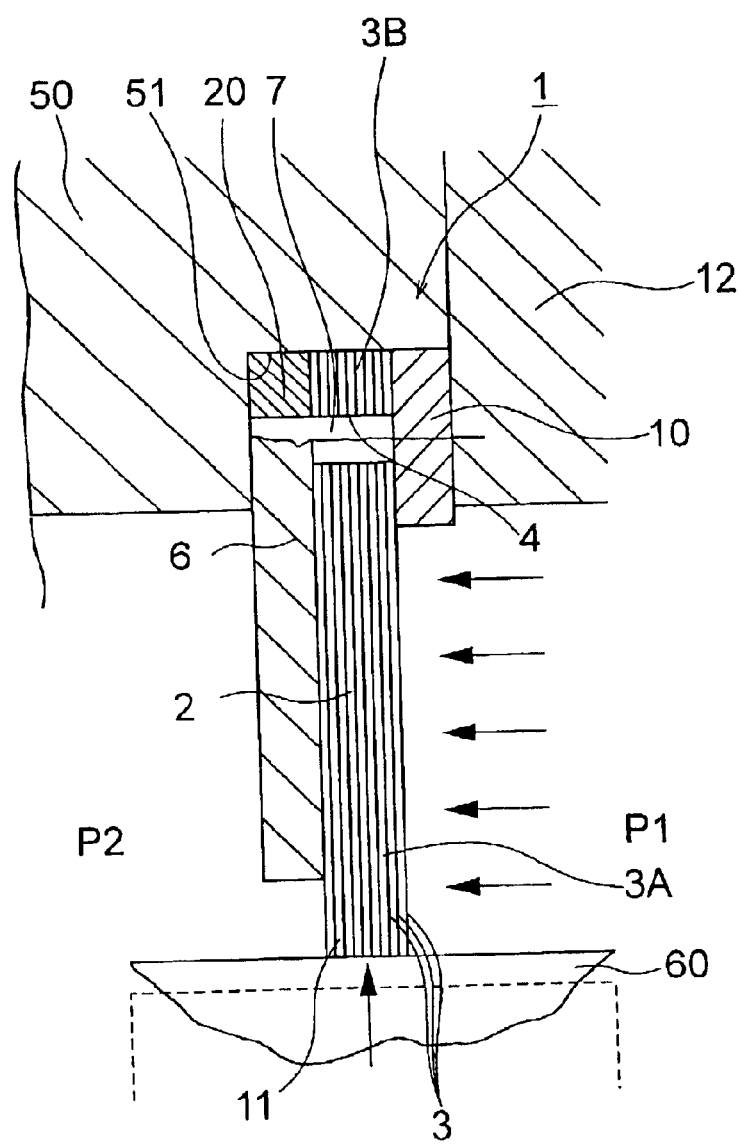
FIG. 1 is a sectional view, showing in half a first embodiment of a brush seal device according to the present invention.

The brush seal device in FIG. 1 is an example, that is disposed for sealing the clearance between a casing 50 and a rotor 60 of a gas turbine to separate into a high pressure P1 side and a low pressure P2 side.

Figure 2:
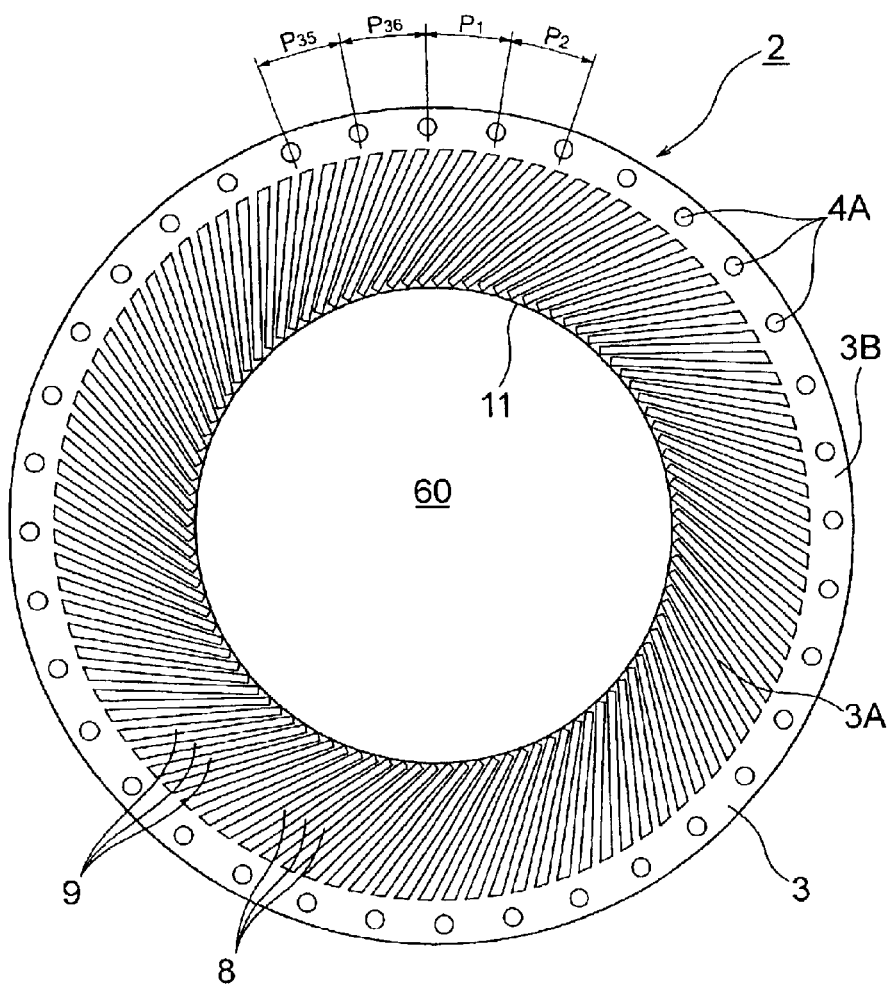
FIG. 2 is an axial front view of the brush seal shown in FIG. 1.

FIG. 2 is a plan view, showing a brush seal 2 mounted to the brush seal device 1 in FIG. 1.

A fixing section 20 at the outer circumference side of the brush seal device 1 is attached, from one side, to a step 51 positioned in the inner circumferential surface of the casing 50 as one of two components, through an attachment part 12. The fixing section 20 may be attached to a channel section formed by a combination structure. The free end 11 at the inner circumferential side of the brush seal device 1 contacts the opposite outer circumferential surface of the rotor (rotational shaft) 60 as the other component, or is located closer to the same. Thus, the brush seal device 1 seals the fluid to be sealed at the high pressure P1 side.

Main components of the brush seal device 1 are a brush seal 2, a back plate section 6 and a retaining section 10. Among them, the brush seal 2 is made by piling thin plate shape brush seal units 3, shown in FIG. 2. The brush seal unit 3 is processed to have slits 9 that incline toward the rotational direction of the rotor 60 at the inner circumferential side of the annular shape thin plate, and thus each of a number of thin beams 8 is formed between two slits 9. The thin beams 8 and slits 9, as a whole, forms a brush section 3A in the form of a strip. The brush seal unit 3 has a base plate section 3B and is mounted to the casing 50 at the outer peripheral of the base plate section 3B.

Figure 3:
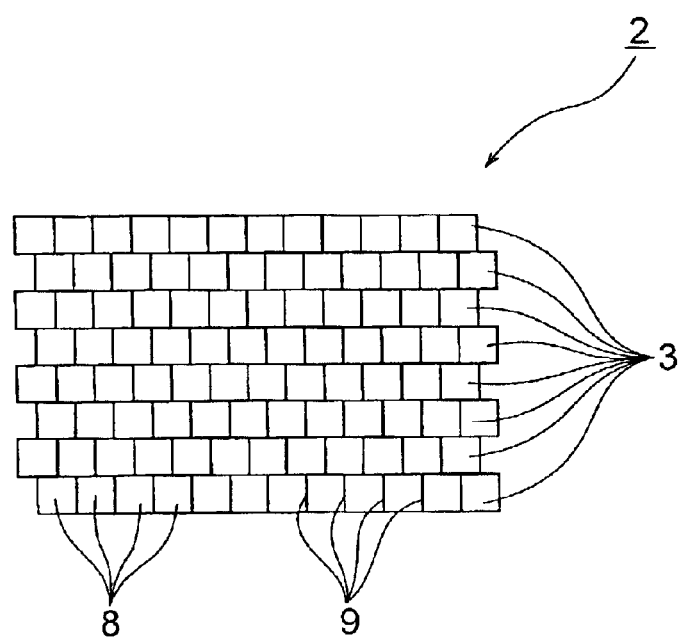
FIG. 3 is a partial plan view of the brush seal shown in FIG. 1, as seen radially from inner side thereof.

As shown in FIG. 3, each thin beam 8 formed between slits of this brush section 3A is shaped in a rectangle in its cross section. Then a plurality of brush seal units 3 are piled and arranged in the axial direction of the rotor 60 to form a wall. An example of the brush sea unit 3 described above is obtained such that a thin, ring shaped plate is processed to have slits 9 forming gaps and thin beams 8 on its inner circumferential side, through wire electric discharging or etching. The cross section of the thin beams 8 is rectangular (rectangular if the thin plate has the width larger than the thickness, while be square if the width and thickness are same.), and one side of the cross section is $(0.2–0.005)\times(0.3–0.008)$ mm long, preferably $(0.15–0.008)\times(0.2–0.01)$ mm. Its length is within 5–50 mm. The sectional shape of the thin beam is not limited to be rectangular. Any of oval, trapezoid and rectangle may be used. The wall thickness of the brush seal 2 is determined to be 0.5–5 mm; however, it shall be determined, depending on the pressure of the sealed fluid or design conditions.

The base plate section 3B of the brush seal unit 3 is formed outside of the brush section 3A in the shape of a thin annular sheet. In the base plate section 3B is circumferentially provided positioning sections 4 as exemplary positioning holes 4A. Pitches for those positioning holes 4A are slightly different each other. Such differences are determined in the design process to obtain such a dimensional relationship that if one brush seal unit 3 is piled on another one with the positioning holes 4A of the one brush seal unit 3 being displaced by one or two pitches from the positioning holes 4A of the another one and aligned with positioning holes 4A each other, then slits 9 of the one brush seal unit 3 overlap the thin beams 8 of the another one, respectively.

In other words, as shown in FIG. 3, the slits 9 in the piled brush seal units 3 are arranged in a zigzag fashion.

FIG. 3 is a plan view of the brush seal 2, as seen radially from inner side thereof. As shown in FIG. 3, when the brush seal 2 is formed, the brush seal units 3 are piled to a thickness, depending on the sealing ability as desired. The pitches in the positioning sections are designed so that the slits 9 of the brush seal unit 3 are blocked with the thin beams of the neighboring brush seal unit 3. Accordingly, it is allowed to assemble easily and precisely by aligning the neighboring brush seal units at mutually different positioning sections 4, regardless of the number of piled brush seal units 3.

The brush seal unit 3 is formed from a thin plate of steel, stainless steel, nickel-base alloy, ceramic, or the like. As the brush seal unit is processed by micro-fabrication, such as wire electric discharging and etching processes, it is provided with highly accurate dimensions.

When the brush seal unit 3 is laid on the back plate section 6, the positioning hole 4A is fitted to the positioning pin 7 fitted in the back plate section 6. As the positioning pin 7 and hole 4A fit in contact each other, the brush seal unit 3 can be placed precisely in position. The operation to pile for assembling the brush seal unit 3 is easy and a highly accurate assembly can be obtained due to precisely positioned placement for assembling operation. Additionally, as it is not needed to weld the base plate section 3B to form the fixing section 20, there exists no distortion or irregularity due to thermal deformation.

Figure 4:
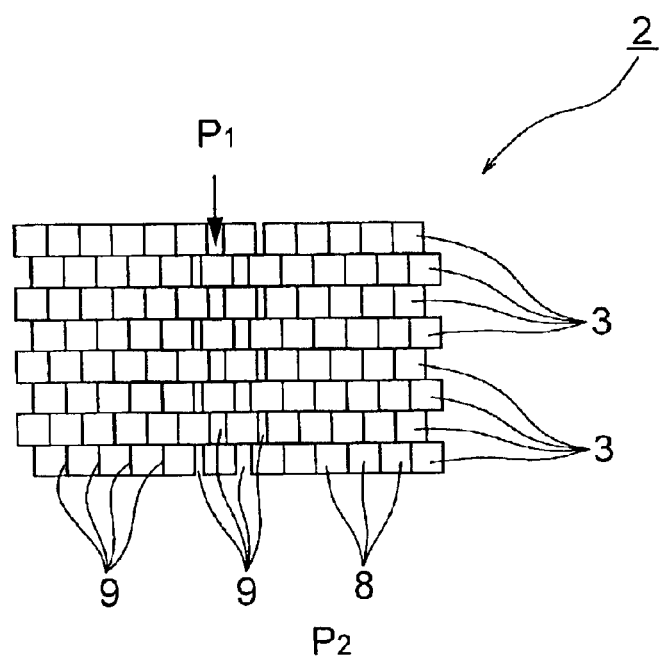
FIG. 4 is a partial plan view as seen radially from the inner side, showing the state in which sealed fluid acts on the brush seal of the present invention in FIG. 1.

FIG. 4 is a partial plan view as seen radially from the inner side, showing the state in which sealed fluid acts on the brush seal 2 of the present invention in FIG. 3. As will be understood from FIG. 4, if the pressure of the sealed fluid acts on the brush seal 2 strongly, the slits 9 are partially forced to open slightly. However, each slit 9 is pressed to contact by the neighboring thin beams 8 on both sides, thereby to effectively prevent fluid pressure from passing through the slit to open. Thus, the fluid to be sealed can be sealed and the sealing ability of the brush seal 2 is improved.

Figure 5:
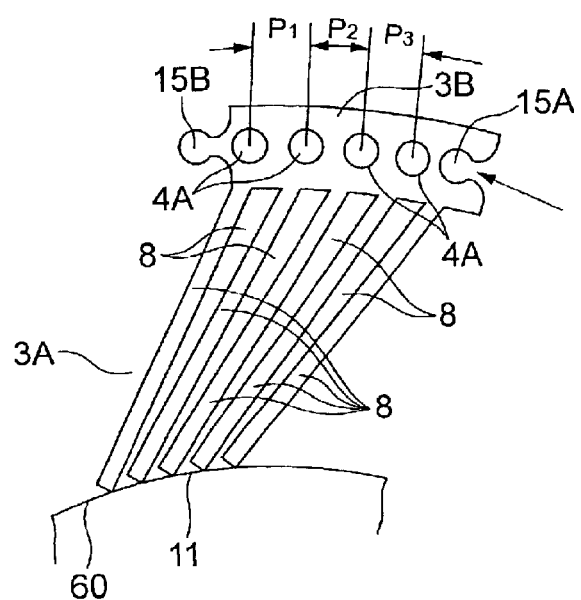
FIG. 5 is a plan view of a modular plate constituting a brush seal unit, showing a second embodiment of the present invention.
Figure 6:
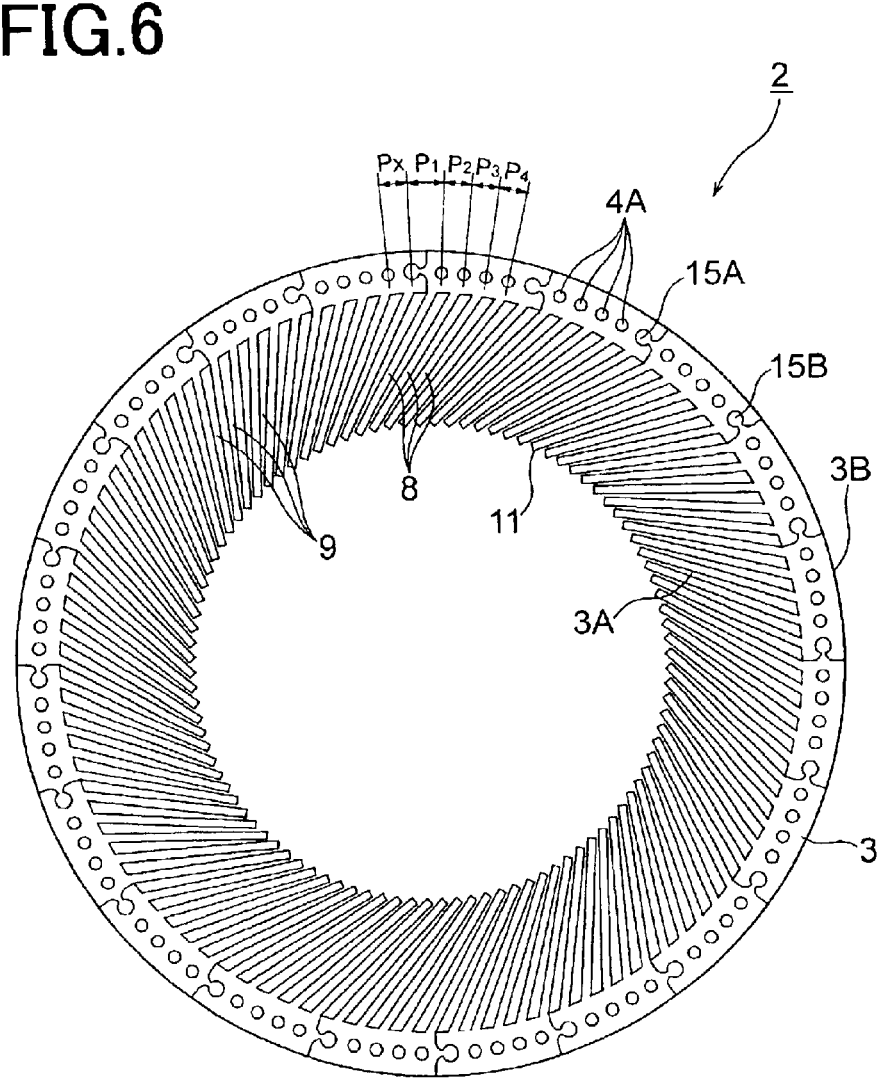
FIG. 6 is a plan view of a brush seal unit, showing the second embodiment of the present invention.

FIG. 5 is a plan view of a modular plate 5 constituting a brush seal unit 3, showing a second embodiment of the present invention. FIG. 6 is a plan view of a brush seal unit 3 in which the modular plates 5 shown in FIG. 5 are combined. FIGS. 7 to 10 are plan views, showing the piling order of the modular plates 5 as another example of the modular plate in FIG. 5.

In FIG. 5, the slits 9 are made somewhat broader at the base plate section 3B side for forming an annular brush seal unit. A connecting recess 15A is provided on one side of the base plate section 3B and a connecting projection 15B on the other side thereof.

In the base plate section 3B is provided four positioning holes 4A forming the positioning sections 4. The connecting recess 15A of this modular plate 5 is coupled with the connecting projection 15B of a next modular plate 5.

By coupling a plural modular plates 5 one by one in such a manner, the brush seal unit 3 as shown in FIG. 6 is completed.

When those brush seal units 3 are piled in order, the positioning holes 4A forming the positioning sections 4 is circumferentially displaced by one pitch for every brush seal unit 3. As a result, the brush seal units 3 are, as shown in FIG. 3, piled such that each slit overlaps each thin beam 8. It is easy to pile the brush seal units 3 by fitting the positioning holes 4A to the positioning pin 7 provided in the back plate section 6. Additionally, as shown in FIG. 3, it is possible to combine the slits and the thin beams easily and align them precisely.

Figure 7:
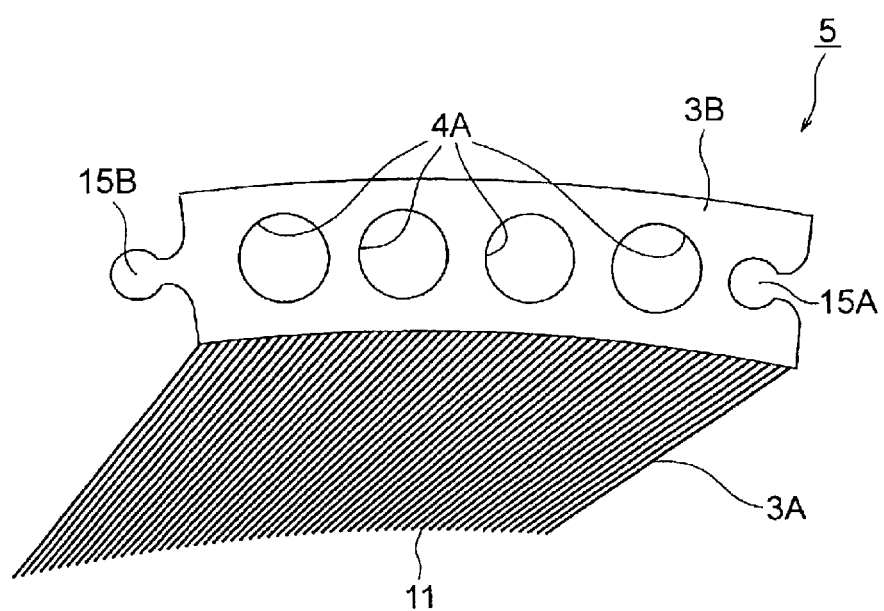
FIG. 7 is a plan view of another example of the modular plate in FIG. 5.

FIG. 7 is a plan view of a modular plate 5 of another example, which is made by micro-fabrication with chemical etching process. The thin beams 8 of the brush section 3A are inclined toward the rotational direction of the rotor 60 and the width of the slit 9, or the interval of the beam 8 is made minute. Four positioning holes 4A are formed in the base plate section 3B. The pitches P1, P2 and P3 (see FIG. 6) for those positioning holes 4A are slightly different each other. Dimensions in physical relationship between the positioning sections 4, slits 9 and thin beams 8 of each modular plate 5 is designed so that the piled brush sea units 3 show a relationship as shown in FIG. 3. In other words, the brush sea unit 3 is formed in such a dimensional relationship that each slit 9 of one brush sea unit 3 and each thin beams of its neighbor brush sea unit 3 can overlap each other by relatively displacing the neighboring brush sea units 3 by one pitch. At each end of the base plate section 3B are provided a connecting recess 15A and a connecting projection 15B for connecting sequentially a plurality of modular plates.

Figure 8:
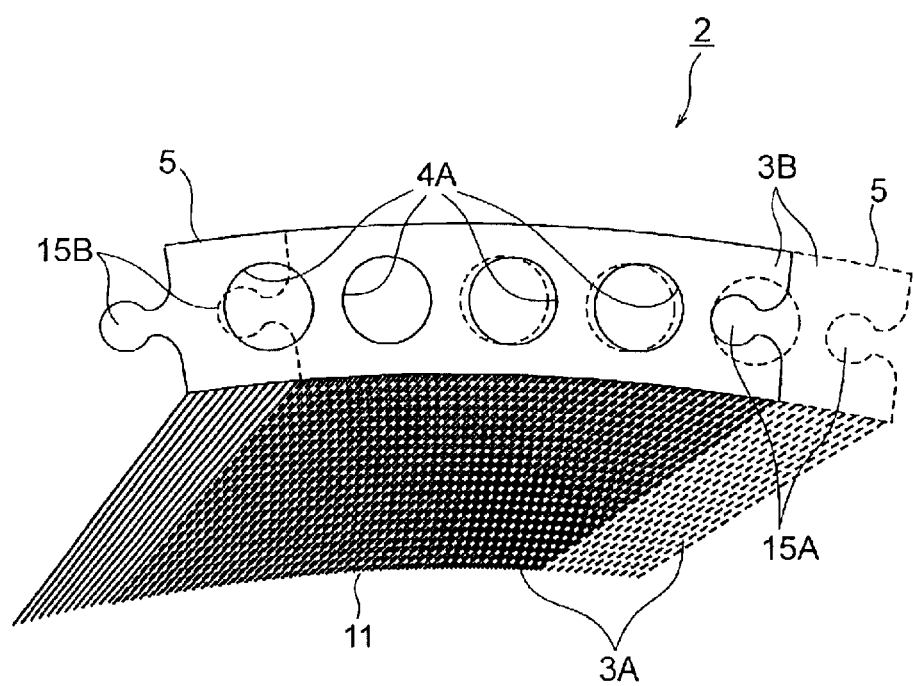
FIG. 8 is a plan view, showing a state that two modular plates shown in FIG. 7 are piled with their positioning sections being displaced by one pitch each other.

FIG. 8 shows a state in which, in two neighboring modular plates 5, first positioning hole 4A of one modular plate 5 is aligned with second positioning hole 4A of the other modular plate 5, in other words, the one modular plate 5 is displaced by one pitch relative to the other.

Figure 9:
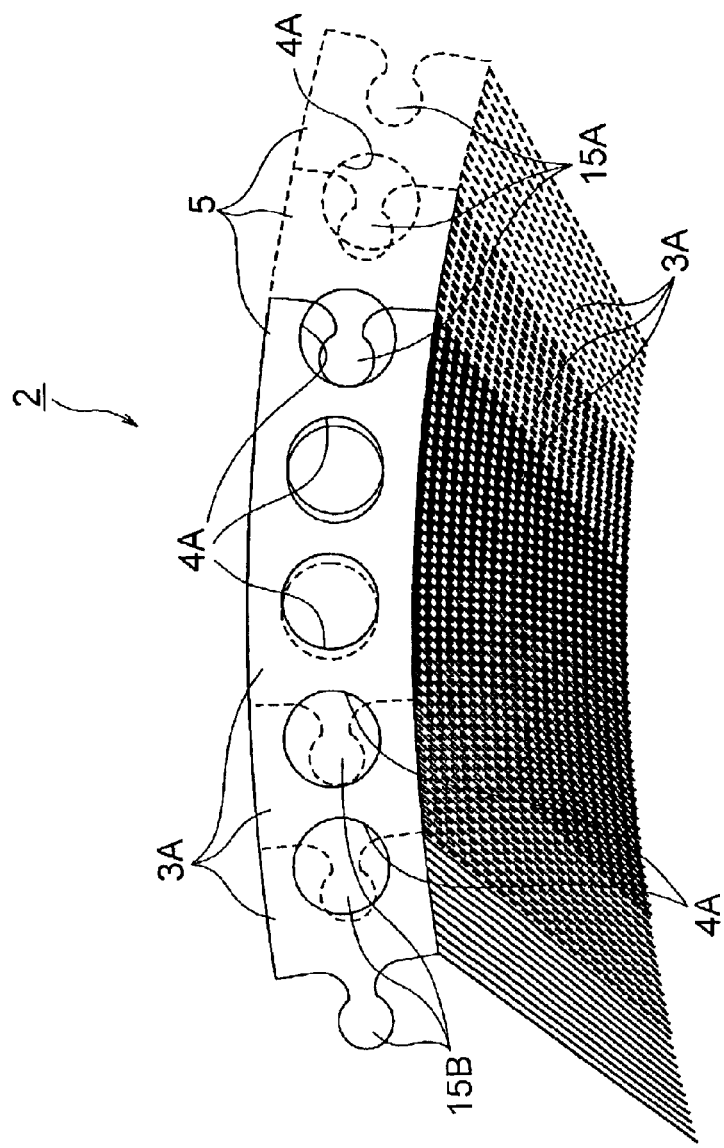
FIG. 9 is a plan view, showing a state that three modular plates shown in FIG. 7 are piled with their positioning sections being displaced by one pitch each other.

FIG. 9 shows a state in which three modular plates 5 are piled. They are relatively displaced by one pitch in piling order.

Figure 10:
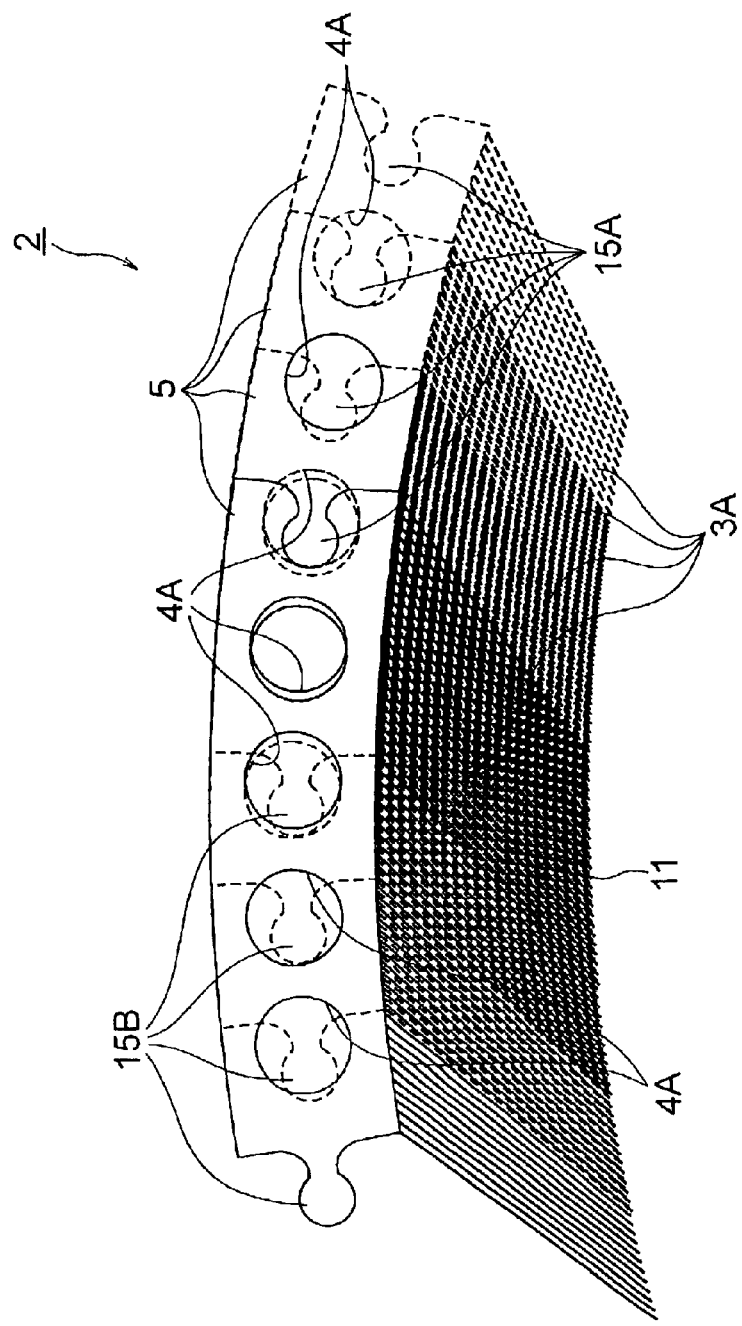
FIG. 10 is a plan view, showing a state that four modular plates shown in FIG. 7 are piled with their positioning sections being displaced by one pitch each other.

FIG. 10 shows a state in which four modular plates are piled. They are relatively displaced by one pitch in piling order.

In such a way for piling, it becomes possible to form easily the brush seal 2 in the shape of a circular arc or a ring. Further, the brush seal units can be piled with the slits 9 overlapping the thin beams 8 each other, as shown in FIG. 3.

Figure 11:
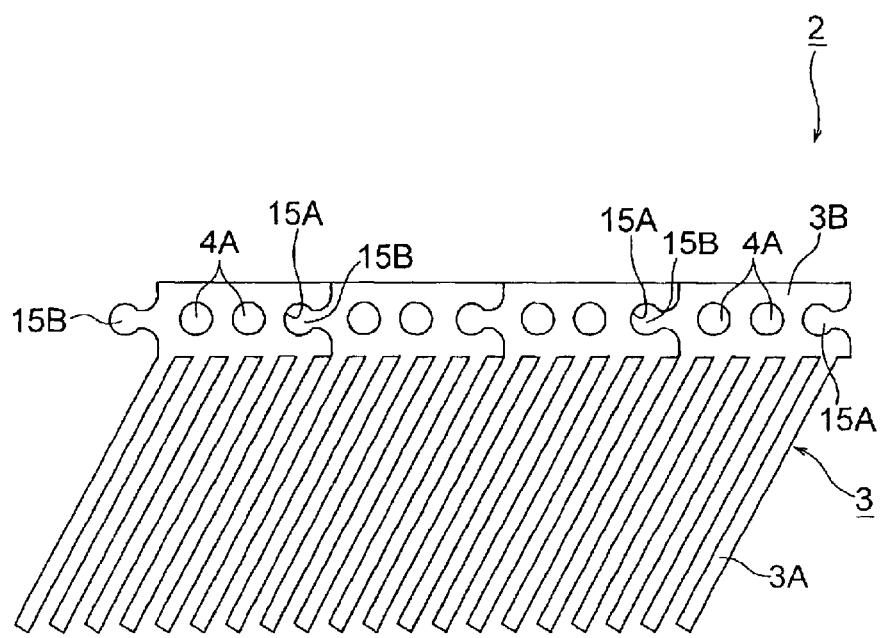
FIG. 11 is a plan view of a brush seal unit in which a plurality of the modular plates of a third embodiment according to the present invention are assembled.
Figure 12:
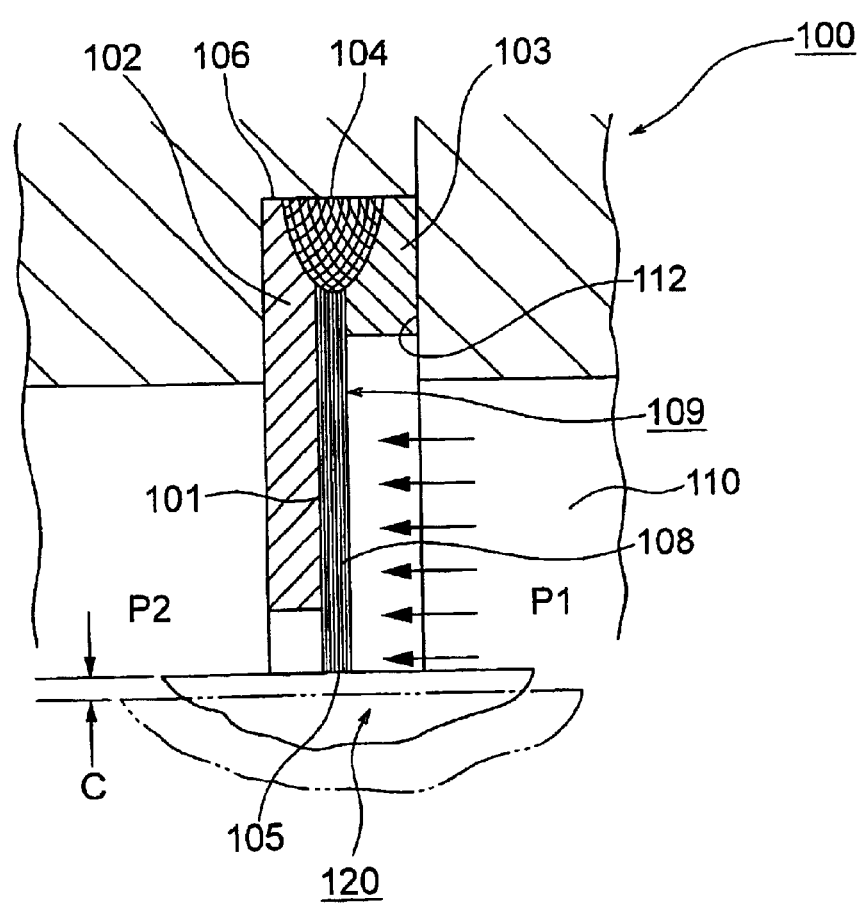
FIG. 12 is a sectional view, showing in half a conventional brush seal.
Figure 13:
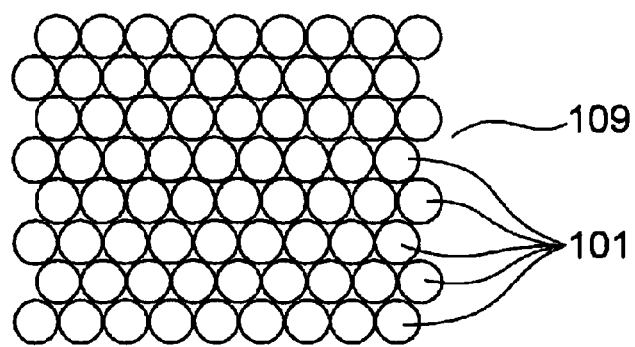
FIG. 13 is a partial plan view of a brush seal in FIG. 11, as seen radially from the inner side thereof.
Figure 14:
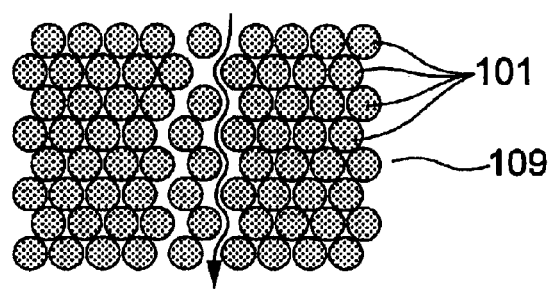
FIG. 14 is a partial plan view as seen radially from the inner side, showing the state in which sealed fluid acts on the brush seal of the present invention in FIG. 11.
Figure 15:
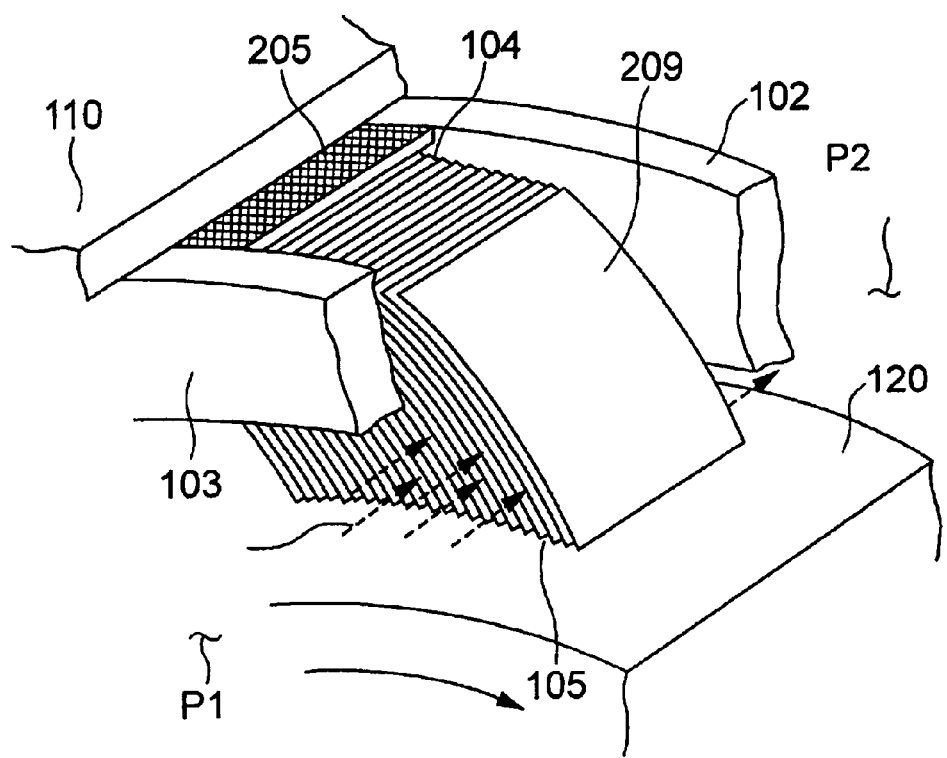
FIG. 15 is a partial side view, showing another conventional seal.

FIG. 11 is a plan view of a straight brush seal unit 3 having a plurality of modular plates 5 of a constitution shown in FIG. 5. In order to obtain predetermined length, they are connected using each connecting recess and projection 15A and 15B provided on the respective ends. When each brush seal unit 3 is piled, the positioning hole 4A is displaced relative to another brush seal unit 3 and align with a different positioning hole 4A of the another brush seal unit 3 and the neighboring thin beams 8 and slits 9 are therefore overlapped each other.

It is an advantage of the combination of the modular plates 5 that any shape can be employed for the brush seal unit 3. Only one annular brush seal unit 3 is obtained from one thin plate. On the contrary, a number of modular plates can be obtained from one thin plate because of good yield thereof.

Furthermore, as the modular plates 5 are made from a thin plate, it is allowed to form them precisely with micro-fabrication, such as wire electric discharging, chemical etching, laser beam and electronic beam processes.

Other preferred embodiments according to the present invention will be described, hereinafter.

In a brush seal 2 of a second embodiment according to the present invention, the brush seal unit 3 has a plurality of divided modular plates 5, the modular plate 5 has a connecting recess 15A at its one end and a connecting projection 15B at its other end, and the connecting recess 15A and the connecting projection 15B of the modular plate 5 are coupled each other.

In the brush seal 2 of the second embodiment according to the present invention, it is possible to fabricate modular plates 5 from one thin plate with improvement in the yield of material. The modular plates 5 obtained are coupled each other, using each connecting recess and projection 15A, 15B, to form a brush seal unit 3. By piling to assemble using the positioning sections 4 it is allowed to make easily the brush seal 2 having an accurate shape and good sealing ability.

In the brush seal 2 of the third embodiment according to the present invention, the positioning sections 4 are constituted as holes.

In the brush seal 2 of the third embodiment according to the present invention, it is possible to process easily and precisely with micro-fabrication such as etching process or machining process because the positioning sections 4 are formed as a plurality of positioning holes 4A. Accordingly, it is expected to improve the positioning accuracy and sealing ability.

In the brush seal 2 of the forth embodiment according to the present invention, the positioning sections 4 of the brush seal unit 3 and the positioning sections 4 of the brush seal unit 3 facing the former brush seal unit 3 are formed into recesses and projections that are capable of fitting to engage each other when they are aligned in position.

In the brush seal 2 of a fourth embodiment according to the present invention, when one brush seal unit 3 having positioning sections 4 formed into projections and the other neighboring brush seal unit 3 having positioning sections 4 formed into recesses are aligned each other at their positioning sections 4 to pile, both positioning sections 4 engage each other and at the same time the slits 9 and the thin beams 8 facing thereto are overlapped each other. Accordingly, there exists no gaps formed by the slits in the direction of the sealed fluid action, thereby to seal the sealed fluid effectively.

Also, in each of the embodiments of the brush seal and the brush seal device according to the present invention, following superior effects are expected.

According to the brush seal 2 related to the first embodiment, when the neighboring brush seal units 3 are piled such that their positioning sections 4 are relatively displaced by one pitch, the strip-like slits 9 of one brush seal unit 3 overlap the thin beams 8 of the neighboring brush seal unit 3, while the beams 8 of the one brush seal unit 3 overlap the strip-like slits 9 of the neighboring one 3 and the slits 9 are therefore blocked.

By piling two neighboring brush seal plate units 3, 3 in such a manner that the positioning sections 4 of one seal plate unit 3 is displaced by one pitch from the positioning sections 4 of the other brush seal unit 3, neighboring strip-like slits 9 and thin beams 8 of the brush seal units 3, 3 overlap each other.

Accordingly, it is possible to pile the brush seal units 3 with their slits 9 and thin beams 8 overlapping each other, even if the thin beams are fine. A piling condition effective to sealing ability is achieved by only aligning the positioning sections 4 at a different pitch.

Accordingly, it becomes possible to improve the sealing ability of the brush seal even if the number of the brush seal units 3 to be piled is less. Additionally, it is expected that frictional wearing is effectively prohibited as the brush seal has flexibility due to less number of the piled brush seal units 3 and can deform elastically corresponding to the contact of the rotational shaft. Further, it is easy to assemble the brush seal units 3 and also considerably improve the accuracy in the assembly.

According to the second embodiment related to the brush seal 2 of the present invention, it is possible to fabricate modular plates 5 from one thin plate with improvement in the yield of material. The modular plates 5 obtained are coupled each other, using each connecting recess and projection 15A, 15B, to form a brush seal unit 3. By piling to assemble using the positioning sections 4 it is allowed to make easily the brush seal 2 having an accurate shape and good sealing ability.

Additionally, It is possible to obtain a predetermined brush seal unit 3 by combining the designed modular plates 5. Further, each of the brush seal units 3 that have been disassembled into modular plates 5 can be re-assembled accurately as it is, using the positioning sections 4, thereby allowing to mount the brush seals 2 without removal of the rotor from the casing.

According to the third embodiment related to the brush seal 2 of the present invention, it is possible to process easily and precisely with micro-fabrication such as etching process or machining process. Accordingly, it is expected to improve the positioning accuracy and sealing ability.

According to the fourth embodiment related to the brush seal 2 of the forth embodiment of the present invention, when one brush seal unit 3 having positioning sections 4 formed into projections and the other neighboring brush seal unit 3 having positioning sections 4 formed into recesses are aligned each other at their positioning sections 4 to pile, both positioning sections 4 engage each other and at the same time the slits and the thin beams facing thereto are overlapped each other. Accordingly, there exists no gaps formed by the slits 9 in the direction of the sealed fluid action, thereby to seal the sealed fluid effectively.

According to the first embodiment related to the brush seal device 1 of the present invention, by piling two neighboring brush seal units 3, 3 in such a manner that the positioning sections 4 of one brush seal unit 3 are displaced by one pitch from the positioning sections 4 of the other seal plate unit 3, neighboring strip-like slits 9 and thin beams 8 of the brush seal units 3, 3 overlap each other.

It is extremely difficult for an assembly machine to pile the brush seal units 3 with the thin fine beams 8 and slits 9 overlapping precisely each other, as specified in design. However, a piling condition effective to sealing ability is easily achieved by displacing one positioning sections 4 from the other positioning sections 4.

Additionally, it becomes possible to assemble the brush seal 2 exactly and easily without deviation among the brush seal units 3, by fitting the positioning sections 4 to the positioning pin 7 of the back plate section 6 and sandwiching against the retaining section 10.

Having described specific embodiments of the invention, however, the descriptions of these embodiments do not cover the whole scope of the present invention nor do they limit the invention to the aspects disclosed herein, and therefore it is apparent that various changes or modifications may be made from these embodiments. The technical scope of the invention is specified by the claims.

What is claimed is:

1. A brush seal of a brush seal device, mounted on one of two components that are relatively rotated, for sealing the clearance given between the two components, comprising:

a plurality of the brush seal units, each having a strip-like brush section on a side facing the other component and having a base plate section on a side opposing the side having the brush section, the brush section being formed with thin beams each of which is between two slits, and the base plate section being fixed to the one component; and a plurality of positioning sections spaced at pitch intervals located in the base plate section of the brush seal unit;

wherein the pitch intervals of the positioning sections are determined so that, by relatively displacing by one pitch the positioning sections of the neighboring brush seal units to be piled, the strip-like slits and thin beams can overlap each other, and wherein the brush seal unit has a plurality of divided modular plates, the modular plate has a connecting recess at its one end and a connecting projection at its other end, and the connecting recess and the connecting projection of neighboring modular plates are coupled each other.

2. The brush seal as set forth in claim 1, wherein the positioning sections are constituted with holes.

3. The brush seal as set forth in claim 1 further comprising:
- a back plate section having a fixing section provided with a positioning pin capable of fitting in the base plate section of the brush seal and having a bearing face for bearing the side face of the brush seal; and
- a retaining section for retaining, in cooperation with the back plate section, the base plate section of the brush seal;
- wherein the base plate section of each brush seal unit is provided with positioning sections in which holes are formed by one pitch thereof; each pitch is defined as an interval so that, when the positioning sections of the neighboring brush seal units piled are relatively displaced, the slits and thin beams of the neighboring brush seal units overlap each other; and the positioning pin of the back plate section fits in a hole of the positioning sections of the brush seal, thereby to couple the back plate section with the brush seal.

4. A brush seal of a brush seal device mounted on one of two relatively rotated components for sealing a clearance between the two components, comprising:
- a plurality of brush seal units, each brush seal unit having a strip-like brush section on a side facing the other component and a base plate section on a side opposing the side having the brush section, the brush section being formed with thin beams each of which is between two slits, the base plate section being fixed to the one component; and
- a plurality of positioning sections spaced at pitch intervals located in the base plate section of the brush seal unit,
- wherein the brush seal unit has a plurality of divided modular plates provided with connecting portions respectively at each end thereof, and the pitch intervals of the positioning sections are determined so that, by relatively displacing by one pitch the positioning sections of the neighboring brush seal units to be piled, the strip-like slits and thin beams overlap each other.

5. The brush seal as set forth in claim 4, wherein the positioning sections include a plurality of holes.

* * * * *